UNITED STATES PATENT OFFICE.

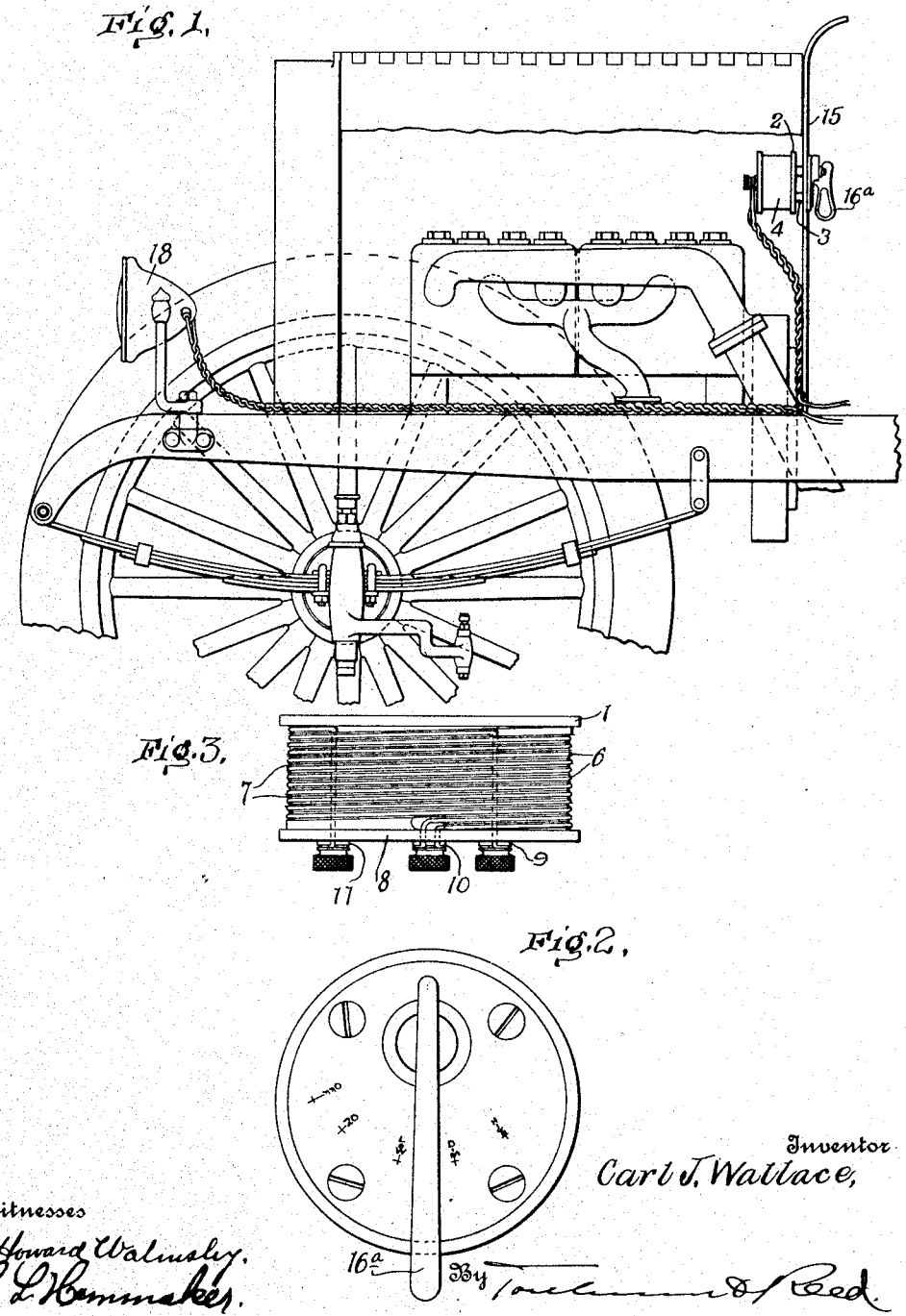

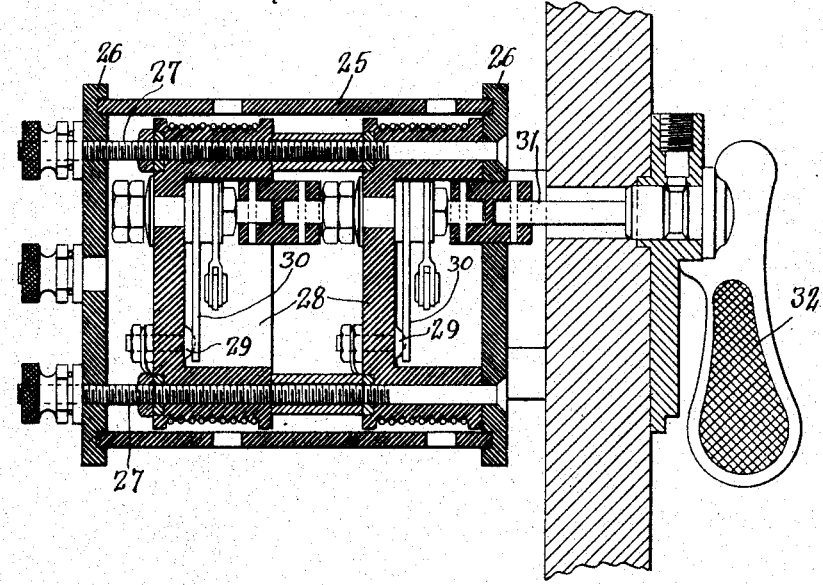
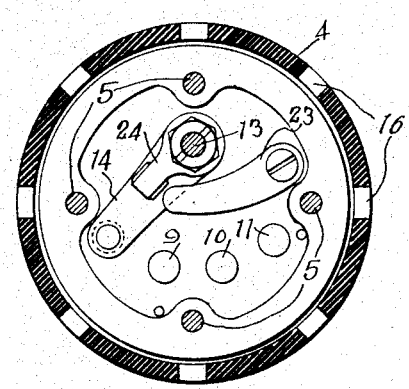
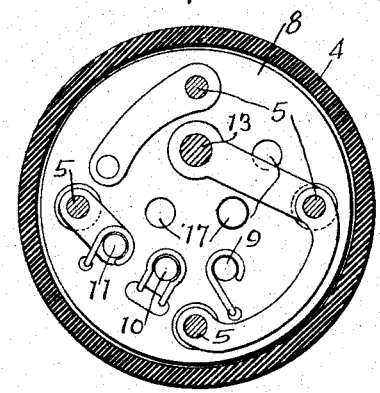

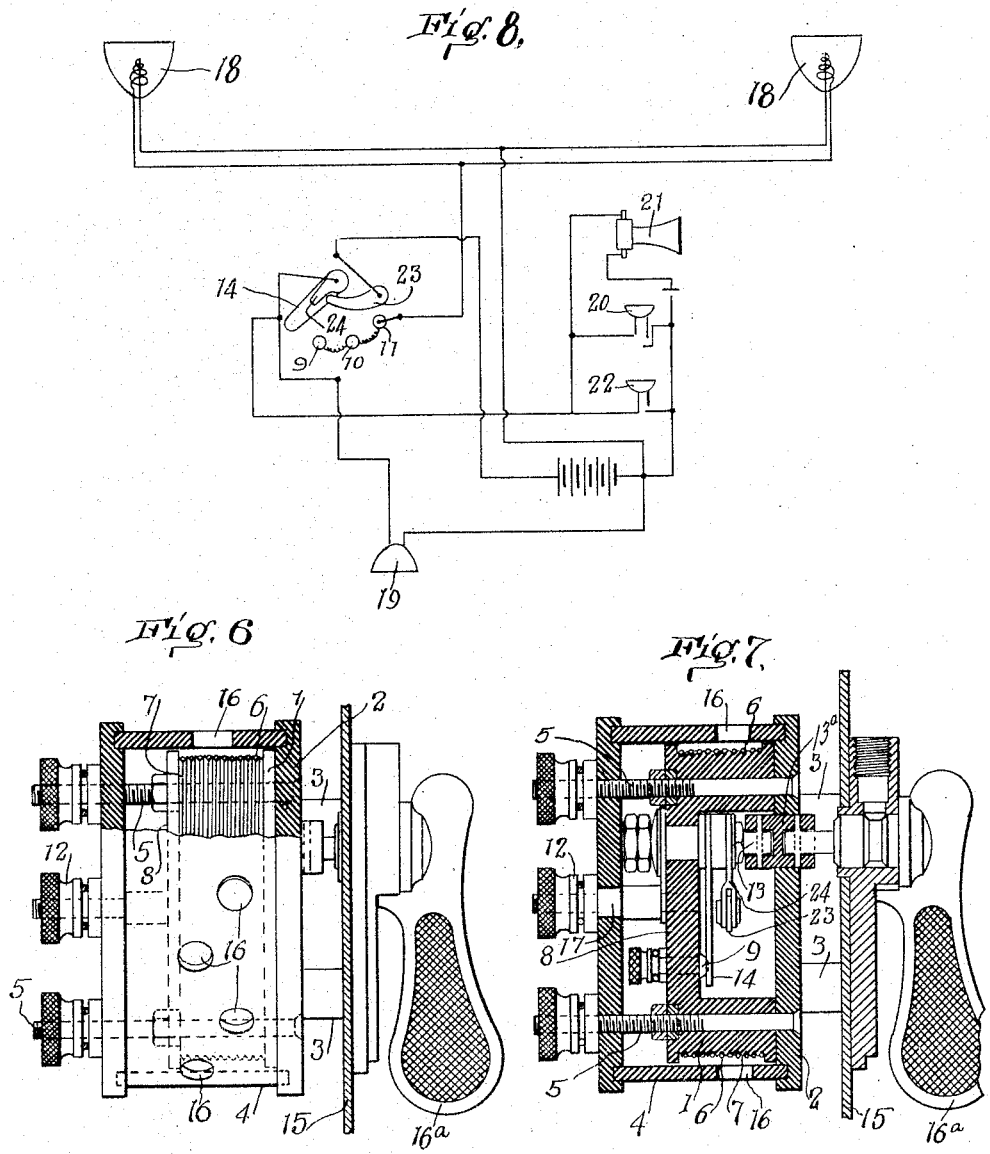

CARL J. WALLACE, OF SPRINGFIELD, OHIO, ASSIGNOR OF FORTY-NINE ONE-HUNDREDTHS TO MARTHA B. TENNANT, OF SPRINGFIELD, OHIO.

DIMMER FOR AUTOMOBILE-HEADLIGHTS.

1,177,976.  Specification of Letters Patent.  Patented Apr. 4, 1916.

Application filed October 4, 1913. Serial No. 793,367.

*To all whom it may concern:*

Be it known that I, CARL J. WALLACE, a citizen of the United States, residing at Springfield, in the county of Clark and State of Ohio, have invented certain new and useful Improvements in Dimmers for Automobile-Headlights, of which the following is a specification, reference being had therein to the accompanying drawing.

This invention relates to dimmers for automobile head lights.

Electrical head lights commonly employed upon automobiles have very powerful reflectors and the light projected therefrom is exceedingly brilliant and while of great value in illuminating the roadway where this is necessary it has a blinding effect upon persons approaching the car carrying the head light and it is desirable that the brilliancy of the head light should be reduced to as great an extent as is practicable with the requirements thereof. For example, while it is desirable to have a very powerful head light in running along the country road and one that will illuminate the road a long distance ahead of the machine, such a light is unnecessary in the city, as the city lights will disclose other vehicles or large obstructions in the roadway and it is only desirable that the head lights should be powerful enough to illuminate the roadway a short distance in front of the machine to disclose smaller objects or ruts which might not be disclosed by the street lights. In fact, in some cities it is required by law that the powerful head lights either be dimmed or turned out entirely when used within the city limits. When the machine is standing on the curb or is idle in any other position where the law requires signal lamps it is desirable that the head lights be capable of being still further dimmed in order that they may be utilized as signal or ordinance lamps and thus the additional pair of lamps commonly carried by automobiles as ordinance lights may be dispensed with, thus not only eliminating the expense of this pair of lamps but simplifying the wiring of the machine.

The prime object of the present invention is to provide a dimmer or a controlling device for head lights whereby these three distinct degrees of brilliancy may be obtained at the will of the operator.

It is a further object of the invention to provide such a dimming device which will be of a very simple construction and can be inserted in the head light circuit of existing cars without materially disturbing that circuit.

It is a further object of the invention to so construct the dimming device that the parts thereof, and particularly the resistance winding, will be readily accessible for repairs or renewal.

It is also an object of the invention to provide such a device adapted for application to a three wire circuit.

It is a still further object of the invention to provide in combination with the dimmer a switch or controlling device for other lamps or electrical devices carried by the automobile, whereby the manipulation of a single operating device will close the circuit through all the electrical devices or lamps on the car and maintain the circuit closed while the degree of brilliancy of the head lights is varied from one point to another.

In the accompanying drawings, Figure 1 is a side elevation, partly broken away, of the forward portion of an automobile showing my invention applied thereto; Fig. 2 is an elevation of the dimmer as viewed from the driver's seat; Fig. 3 is a plan view of the core; Fig. 4 is a sectional view, taken transversely of the axis of the dimmer; Fig. 5 is a rear elevation of the core; Fig. 6 is a side elevation, partially broken away; Fig. 7 is a section taken parallel with the axis of the dimmer; Fig. 8 is a diagram of the circuits; Fig. 9 is a longitudinal section of a slightly modified form of the invention.

In Figs. 1 to 8, inclusive, of the drawings I have illustrated that form of the invention which is best adapted to the ordinary two wire head light circuit, such as is found in most automobiles. As shown in Figs. 1 and 8 the controlling device is mounted in the lamp circuit and by manipulating the same the amount of current passing through the circuit to the lamps may be regulated and the degree of brilliancy of the lamps determined. As shown in these figures the device is mounted upon the forward side of the dash-board of an automobile and the actuating member is arranged on that side of the dash-board adjacent to the driver. It will be understood, however, that this form of the device is chosen for the purpose of illustration only and the device may be mounted in any suitable position, such, for example, as on the steering post, and may be provided with any suitable actuating member.

The particular device here shown and described comprises a supporting member or core 1 mounted upon a suitable base 2 which is here shown as mounted on the dash-board and spaced away therefrom by means of studs 3. Fitting over the core and the parts carried thereby is a casing 4 secured to the base by suitable attaching devices 5. This casing comprises a cylinder having that end opposite the base 2 closed, and together with the base constitutes a housing within which the mechanism is inclosed. The support or drum 1 has wound about the same a suitable quantity of resistance wire 6 and is preferably provided with spiral grooves 7 to receive the wire which may or may not be insulated. The core is preferably hollow but is closed at that end remote from the base 2 by means of a suitable head 8. Mounted in this head are a series of contact members 9, 10 and 11 having their contact portions arranged on the inner side of the head 8 and having their opposite ends extending on the outer side of the head 8 and connected with the resistance wire 6 at intervals along its length. The contact member 11 is connected through one of the connecting members 5 with the head light circuit which is also connected with a binding post 12 which is electrically connected with a rotatable stud 13 on which is mounted a lever or switch arm 14 adapted to be moved into engagement with any one of the contact members 9, 10 and 11. It will be obvious that when the switch arm is in engagement with the contact member 9 the whole of the resistance will be interposed in the head light circuit and the illumination will be reduced to a minimum degree, in which condition the lamps would serve as ordinance lamps only. When the switch arm is in engagement with the contact member 10 a smaller portion of the resistance would be cut into the circuit and a medium degree of illumination secured and when the switch arm is in engagement with the contact member 11 the resistance will all be cut out of the circuit and the full illumination of the head light secured. The manner of winding the resistance wire about the core and connecting the same with the contact members may be varied as circumstances may dictate, but in the devices here shown the wire is double and looped about the central contact member 10, then wound about the drum and the two ends thereof brought across the drum and attached to the contact members 9 and 11, respectively. This is a very simple form of winding and eliminates the necessity of making the connection in the middle of the core.

The core itself may be made of any suitable material and if the wire and other parts are properly insulated need not be of insulating material but I prefer to employ insulating material for this purpose and I find the product known commercially as bakelite to be very satisfactory for this purpose, as it combines the necessary strength and toughness with the insulating and heat resisting qualities. It is desirable that the interior of the housing and core should be properly ventilated to prevent overheating as a result of the heat generated by the current in the resistance wire and I have, therefore, provided the housing and the head of the core with vents 16 and 17, respectively, by means of which a circulation of air is maintained within the housing. The rotatable stud 13, on which the switch arm is mounted, may be actuated in any suitable manner but as here shown I have extended the same beyond the base 2 and through the dash-board of the vehicle, which is shown at 15, where it is provided with an actuating piece or lever 16$^a$ and constitutes what is known as a "kick-switch", that is, a switch arranged in a position to be actuated by the driver's foot. But obviously, a suitable device for operation by hand or otherwise may be provided if desired. In the present instance the extension to the stud 13, which extends through the dash board, is formed separate from the stud and is connected thereto by a sleeve of insulating material, 13$^a$, which prevents the current from passing to the switch handle 16$^a$.

It may sometimes be desired to control the other lights and devices on the circuit, as well as the head lights, by a single actuating device and I have illustrated in the drawings means by which this may be accomplished. In addition to the head lights, which are shown at 18, in the diagram of Fig. 8, an automobile usually carries the tail light 19, the speedometer light 20 mounted on the dash-board, and an electrical horn 21, and, in the case of closed cars, inside lights, which are indicated at 22. All of these lights other than the head lights and tail light may be characterized under the head of "extras," which term may include any extra devices attached to the circuits. In order to close the circuit through the tail light and extras by the manipulation of the actuating member 16$^a$ I have mounted in the circuit a contact arm 23 and have provided the rotatable stud 13 with an additional switch arm 24. The arms 23 and 24 are preferably so arranged that they will come in contact one with the other and close the respective portions of the circuit, which portions include the extras and tail light, before the arm 14 comes in contact with the first of the contact points, thus enabling the tail light and extras to be utilized, if desired, without the use of the head lights, it being understood that the tail light and each extra may be provided with independent cut-outs to enable them to be used when desired, but this use is always dependent upon the circuit being closed through the main switch or closing device which, in the present instance, constitutes a part of the dimmer. The arrangement of the arms 23 and 24 is such that they will remain in engagement during the movement of the arm 14 over the several contacts, thereby maintaining the other circuits closed while the switch arm is being shifted from one contact point to the other for the head lights.

Some automobiles, and especially those carrying electrical plants of a relatively high voltage are equipped with a three wire system and require a somewhat different controlling device from those cars having the two wire system. In Fig. 9 of the drawings I have shown the device slightly modified to adapt it for use with the three wire system. Briefly, it consists of a duplication of the controller above described having the switch arms controlled in unison and insulated from each other. It may or may not be adapted to control the circuits for the extras. In construction the device comprises a cylindrical casing 25 having cylinder heads 26 secured thereto by means of bolts 27 extending through the same lengthwise of the cylinder. Two supporting devices or cores 28 are mounted within the casing and are supported in position therein by means of the rods or bolts 27. Both cores are wrapped with resistance wire and provided with contact members 29, these members being similar in number and arrangement to those already described. Each core is also provided with a switch arm 30 to engage with the several contact members and these two switch arms are connected with a single rotary device or shaft 31 having at its outer end an actuating member 32 by means of which the two actuating arms may be simultaneously moved from one position to another. The resistance wire on one core is connected with the positive side of the three wire circuit and the resistance wire on the second core is connected with the negative side of that circuit. The operation and result are substantially those above set forth.

The use and operation of my invention will be readily understood from the foregoing description and it will be apparent that I have provided a very simple yet efficient means for dimming the head lights of an automobile to secure the desired degrees of brilliancy; further that I have provided means connected with such a dimmer for controlling the other portions of the automobile circuits; and that the device is adapted by slight modifications for application to a three wire system as well as a two wire system. Further, it will be apparent that the construction of the dimmer itself is not only simple but is strong and durable, having no parts that will be easily broken or disarranged; and further, that the parts of the dimmer are readily accessible and that the resistance winding is such that it can be readily removed or renewed. It will be further noted that the resistance wire is supported throughout its entire length and thus held effectually against vibration, this being particularly true where the core is grooved to receive the winding. By thus supporting the wire and preventing its vibration the tendency of the wire to crystallize is greatly reduced and consequently the length of the life of the wire increased.

While I have shown and described one embodiment of my invention and a modification thereof it will be understood that this has been chosen for the purposes of illustration only and that I do not desire to be limited to the details of construction shown and described, for obvious modifications will occur to a person skilled in the art. It will further be understood that in referring to a two wire circuit I have intended to include those circuits which are grounded in the frame of the machine and also that while I have shown, and prefer to mount, the device in series in the circuit, as this arrangement has numerous advantages, the invention is not to be limited to such an arrangement.

Having thus fully described my invention, what I claim as new and desire to secure by Letters Patent, is:—

1. In a device of the character described, a casing of insulating material, a drum of insulating material rigidly mounted in said casing, a resistance coil wound about said drum, said drum and said casing having openings therein to permit of the free circulation of air about said drum, fixed contact members mounted on the head of said drum and connected with said resistance coil, a movable contact member mounted on the head of said drum and adapted to be moved into engagement with any one of said fixed contact member, and means mounted at the end of said casing and operatively connected with said movable contact member to actuate the same.

2. In a device of the character described, a casing of insulating material, a hollow drum of insulating material rigidly mounted within said casing, having one end in engagement with the adjacent head of said casing and having its other parts spaced away from said casing, said drum and said casing having openings therein to permit of the free circulation of air through and about said drum, a resistance coil wound about said drum, fixed contact members mounted on the head of said drum and connected with said resistance coil, a stud journaled in the head of said drum, a contact finger secured to said stud and movable into contact with any one of the fixed contact members, and an operating device mounted at the end of said casing and operatively connected with said stud.

3. In a device of the character described, a casing of insulating material, a hollow drum of insulating material rigidly mounted within said casing, having one end in engagement with the adjacent head of said casing and having its other parts spaced away from said casing, said drum and said casing having openings therein to permit of the free circulation of air through and about said drum, a resistance coil wound about said drum and comprising a part of a lighting circuit, a contact bar mounted within said drum and connected in said lighting circuit, a plurality of fixed contact members mounted within said drum and connected with said resistance coil, a stud journaled in the head of said drum, a contact finger carried by said stud and movable into engagement with any one of said fixed contact members, a second contact finger carried by said stud and movable into and out of engagement with said contact bar, whereby said last-mentioned contact finger and said bar constitute a master switch, and an actuating device mounted at the end of said casing and operatively connected with said stud.

4. In a device of the character described, a casing of insulating material, two drums of insulating material rigidly supported within said casing, each of said drums having a resistance coil wound about the same and connected into a lighting circuit, said drums and said casing having openings to permit of the free circulation of air within said casing and about said drums, a plurality of fixed contact members upon the head of each of said drums, a stud journaled in the head of each of said drums, said studs being connected one to the other, contact fingers carried by said studs and adapted to engage fixed contact members on the respective heads, and an actuating device mounted at the end of said casing and operatively connected with said studs.

In testimony whereof, I affix my signature in presence of two witnesses.

CARL J. WALLACE.

Witnesses:
 IRVIN TENNANT,
 F. W. SCHAEFER.

Copies of this patent may be obtained for five cents each, by addressing the "Commissioner of Patents, Washington, D. C."